United States Patent

Keller et al.

[11] Patent Number: 5,980,853
[45] Date of Patent: Nov. 9, 1999

[54] AROMATIC ACETYLENES AS CARBON PRECURSORS

[75] Inventors: Teddy M. Keller, Alexandria, Va.; Kenneth M. Jones, Ft. Washington, Md.

[73] Assignee: The United States of America as represented by the Secretary of the Navy, Washington, D.C.

[21] Appl. No.: 09/168,066

[22] Filed: Oct. 8, 1998

Related U.S. Application Data

[62] Division of application No. 08/023,442, Feb. 26, 1993, abandoned.

[51] Int. Cl.$^6$ .............................. C01B 31/04; C01D 3/00
[52] U.S. Cl. ........................................ 423/448; 423/449.6
[58] Field of Search .................... 423/448, 449.6

[56] References Cited

U.S. PATENT DOCUMENTS 4,284,834  8/1981  Austin et al. ............................ 585/25

*Primary Examiner*—Duc Truong
*Attorney, Agent, or Firm*—Barry A Edelberg; John J. Karasek

[57] ABSTRACT

A novel compound which polymerizes to a thermoset polymer and which pyrolyzes to amorphous carbon, is selected from the group consisting of:

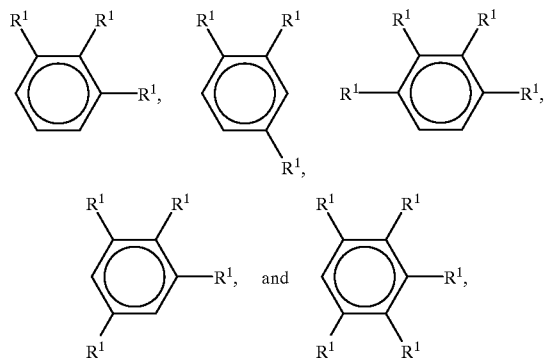

where $R^1$ is —C≡Cφ. A novel thermoset polymer is made by heating an aromatic acetylenic monomeric precursor with the formula:

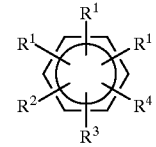

where $R^1$ is —C≡Cφ, and where $R^2$, $R^3$, and $R^4$ are independently selected from the group consisting of —H and —C≡Cφ, or a mixture of two or more of these compounds, to a polymerization temperature. A novel process for making amorphous carbon with high char yield and low porosity, comprises pyrolyzing an aromatic acetylenic monomeric precursor/polymer, or a mixture of two or more precursors/polymers to a temperature in excess of 450° C.

12 Claims, No Drawings

AROMATIC ACETYLENES AS CARBON PRECURSORS

This application is a Div of Ser. No. 08/023,442 filed Feb. 26, 1993 now abandoned.

BACKGROUND OF THE INVENTION

1. Field of the Invention

This invention relates to aryl acetylenic monomers and thermoset polymers made from these aryl acetylenic monomers, and to the use of these monomers and polymers as precursors for amorphous carbon.

2. Description of the Related Art

A. Relating to Amorphous Carbon

Amorphous carbon is a high strength, low weight structural material. It is referred to in the literature as glassy carbon, pyrolytic carbon, or simply as carbon. It maintains its mechanical properties at temperatures up to 3000° C., can be formed into shaped structures, and can be included in a wide range of composite materials. These beneficial properties have made amorphous carbon the material of choice for many applications, especially in the aerospace industry where high strength and low weight are critically important.

Amorphous carbon is typically made by pyrolysis of aromatic compounds such as phenolic resins, phthalonitrile resins, etc. Pyrolysis of these compounds into amorphous carbon involves heating the compounds at sufficiently high temperatures (generally above about 450° C.) to break bonds and evolve a variety of gases containing the non-carbon components of these aromatic compounds, such as $H_2O$, $H_2$, $NH_3$, etc. This results in the formation of a disordered, amorphous network of polycondensed fused aromatic rings with the beneficial properties described above.

Crystalline (i.e. graphitic) inclusions in the amorphous matrix are observed as amorphous carbon is pyrolyzed at temperatures above about 1000° C. This increased ordering of carbon increases the material density, and provides improved structural and electrical properties. Graphitic inclusions improve the stiffness and thermal stability of carbon structures. These improvements in the properties of structures follow increases in the ratio of carbon in crystalline form to carbon in amorphous form in the structure. This ratio in turn follows the length and temperature of the high temperature (>1000° C.) pyrolysis of the structure.

To date, the precursors for and processes for making amorphous carbon have been unsatisfactory to one degree or another. Some precursors are explosive, especially those with ratios of acetylene groups to aryl groups of about 2:1 or higher. Some precursors are made via low yield, multiple step synthetic routes. Moreover, almost all the known precursors result in relatively poor pyrolytic char yield and high porosity, unless carried out under high pressure (>1 atm).

Highly porous materials result from the evolution of large gaseous volumes. In addition to being inherently low yield, highly porous carbon structures have several intrinsic disadvantages, including high gas permeability, poor high temperature stability, poor mechanical properties, and poor chemical inertness. Overcoming these intrinsic disadvantages generally involves some densification of the pyrolytic product.

U.S. Pat. No. 4,284,834 teaches making amorphous carbon with high char yield. However, the complex, multiple step synthesis of the precursor has a very low yield, making this process commercially impractical.

B. Relating to Aromatic Acetylenic Compounds

There are several known compounds with the general formula:

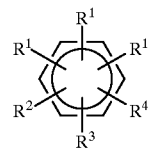

where $R^1$ is $-C\equiv C\phi$, and where $R^2$, $R^3$, and $R^4$ are independently selected from the group consisting of $-H$ and $-C\equiv C\phi$. Specifically, the compounds 1,3,5-tris (phenylethynyl)benzene, 1,2,4,5-tetrakis-(phenylethynyl) benzene, and hexa(phenylethynyl)benzene are known. However, to the best of the applicants' knowledge, the prior art has never taught or suggested the use of these compounds as precursors for thermoset polymers or for amorphous carbon.

Furthermore, to the best of the applicants' knowledge, the specific monomers taught and claimed as the monomers of the invention have never been taught or suggested in the prior art.

SUMMARY OF THE INVENTION

Accordingly, it is an object of this invention to make amorphous carbon with high char yield, good thermal stability, and low porosity.

It is a further object of this invention to achieve these exemplary results in a process carried out at atmospheric pressure.

It is a further object of this invention to make improved monomers and thermoset polymers for use as precursors for making amorphous carbon, where these monomers and thermoset polymers are made by a simple, high yield synthesis.

These and additional objects of the invention are accomplished by the structures and processes hereinafter described.

The monomers of the present invention are:

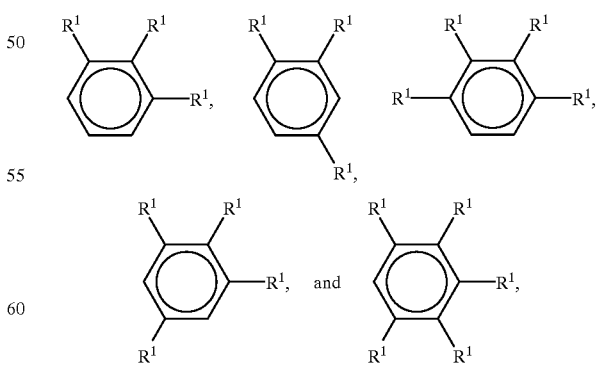

where $R^1$ is $-C\equiv C\phi$.

The thermoset polymers of the present invention are made by heating a compound with the formula:

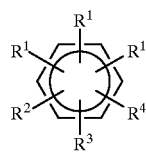

where $R^1$ is —C≡Cφ, and where $R^2$, $R^3$, and $R^4$ are independently selected from the group consisting of alkyl, alkenyl, alkynyl, and aryl functional groups (all of which may be substituted or unsubstituted), and combinations thereof, —H, and —C≡Cφ, or a mixture of these compounds, to a temperature between the melting point of the compound or mixture and the temperature at which a significant amount of the compound or mixture begins to form amorphous carbon.

The process of the invention for making amorphous carbon with high char yield and low porosity includes pyrolyzing a compound with the formula:

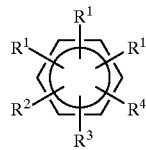

where $R^1$ is —C≡Cφ, and where $R^2$, $R^3$, and $R^4$ are independently selected from the group consisting of alkyl, alkenyl, alkynyl, and aryl functional groups (all of which may be substituted or unsubstituted), and combinations thereof, —H, and —C≡Cφ, or a mixture of these compounds or a polymer of these compounds, by heating the compound or mixture or polymer to a temperature between about the temperature at which a significant amount of the compound or mixture begins to form amorphous carbon and the temperature at which the compound or mixture begins to form significant crystalline graphitic inclusions, to form an amorphous cross-linked structure.

DETAILED DESCRIPTION OF THE INVENTION

A. With Respect to the Monomers of the Invention

All the monomers of the invention are low viscosity liquids upon melting, and consequently provide excellent facility in making shaped amorphous carbon structures. Monomers with high C/H ratios ($\geq 1.5$) are preferred, due to the characteristically smaller volumes of gases evolves from these monomers. Consequently, pentakis(phenylethynyl) benzene, 1,2,3,4-tetrakis(phenylethynyl)-benzene, and 1,2,3,5-tetrakis(phenylethynyl)benzene are particularly preferred embodiments of the present invention.

The monomers of the invention, as well as other aromatic acetylenic monomeric precursors, are preferably synthesized by reacting the appropriate polyhalobenzene with phenylacetylene in the presence of a secondary or tertiary amine and an appropriate catalyst. The preferred polyhalobenzene is the appropriate polybromobenzene. For example, to synthesize 1,2,3-tris(phenylethynyl)benzene, the preferred polybromobenzene reagent is 1,2,3-tribromobenzene. The preferred secondary or tertiary amine is $Et_2NH$, diisopropyl amine, or $Et_3N$. The preferred catalyst is a palladium catalyst, most preferably a palladium/copper catalyst. This is a simple, high yield, single step cross-coupling reaction.

B. With Respect to the Polymers of the Invention

It will generally be preferred to directly pyrolyze, in a single step, one or more of the aromatic acetylenic monomers used in this invention into amorphous carbon. Nevertheless, it is possible to polymerize one or more of these monomers into thermosets, which may then be pyrolyzed into amorphous carbon.

Preferably, a mixture of two or more aromatic acetylenic monomers are polymerized. Polymerizing a mixture of monomers rather than a single monomer provides melting point depression for the mixture, which in turn provides a broader operating range for the invention. A preferred mixture of monomers for polymerization comprises 1,2,4-tris (phenylethynyl)benzene, 1,3,5-tris(phenyl-ethynyl)benzene, and 1,2,4,5-tetrakis(phenylethynyl)benzene, because experiments have shown consistently good results (broad operating range, high char yield) for these materials.

Polymerization takes place between the melting point of the compound or mixture and the temperature at which significant amounts of amorphous carbon begins to form (i.e. the temperature at which pyrolysis begins). Preferably, polymerization takes place between about 200° C. and about 450° C. Lower temperatures result in slower polymerization. Higher temperatures result in increasing carbon—carbon bond reorganization characteristic of pyrolysis.

It should be noted that for the sake of convenience, heating aromatic acetylenic monomers up to about 450° C. is considered herein to be polymerizing heating, and heating above about 450° C. is considered herein to be pyrolyzing. Insofar as pyrolyzing is the dominant process above about 450° C., while polymerizing is the dominant process below about 450° C., this is an accurate characterization. There is, however, considerable overlap in the temperature dependencies of these processes.

Significant (i.e. measurable) polymerization, characterized by the formation of radicals at the acetylenic groups, and subsequent cross-linking, may still be taking place at temperatures as high as about 600° C. to about 650° C. Likewise, significant pyrolysis, characterized by the fusion of aromatic rings, may begin at temperatures as low as about 400° C. to about 450° C.

C. With Respect to the Formation of Amorphous Carbon

Preparing amorphous carbon according to the present invention results in surprisingly high char yield. High char yield is defined herein to be TGA char yield of at least 70% under inert gas, measured at a temperature at which weight loss has stabilized. Char yields of greater than 80% are consistently achieved by the present invention at atmospheric pressure, and char yields in excess of 90% should be readily attainable under higher pressure.

To prepare amorphous carbon according to this invention, one or more of the aromatic acetylenic monomeric precursors described above are heated at a temperature between the temperature at which pyrolysis begins and the temperature at which graphitization begins, preferably between about 450° C. and about 1000° C. More preferably, this heating is done at a temperature between about 600° C. and about 950° C. Most preferably, this heating is done at a temperature between about 700° C. and about 950° C.

To minimize weight loss, this heating is preferably done under an inert or nonoxidizing atmosphere, such as Ar, He, or $N_2$.

Preferably, the product of this pyrolysis is further pyrolyzed to a higher temperature above the temperature at which graphitization begins, preferably between about 1000° C. and about 3000° C. More preferably, the product of this pyrolysis is pyrolyzed to a temperature between about 1500° C. and about 2500° C. Most preferably, the product of this pyrolysis is pyrolyzed to a temperature between about 2000° C. and about 2500° C.

Having described the invention, the following examples are given to illustrate specific applications of the invention, including the best mode now known to perform the invention. These specific examples are not intended to limit the scope of the invention described in this application.

EXAMPLES

Example 1

Synthesis of 1,3,S-Tris(Phenylethynyl)Benzene.

Phenylacetylene (1.943 g, 19.02 mmol), 1,3,5-tribromobenzene (1.6636 g, 5.2843 mmol), triethylamine (22.1 ml, 16.0 g, 158 mmol), pyridine (14.6 ml, 14.3 g, 181 mmol) and a magnetic stirring bar were combined in a 250 ml round bottom flask. The flask was fitted with a septum and then chilled in an isopropanol/dry ice bath. Meanwhile, the catalyst, which consisted of $Pd(PPh_3)_2Cl_2$ (0.1113 g, 0.1585 mmol, Ph=phenyl group), CuI (0.1005 g, 0.5279 mmol) and $PPh_3$ (0.2218 g, 0.8455 mmol), was weighed out. After the flask had cooled, it was degassed by the alternate application of partial vacuum and argon several times. The catalyst was quickly added to the flask, the septum was refitted and the flask was again degassed. The flask was warmed up to room temperature and then set in an oil bath (105° C.) for reaction. The temperature of the oil bath was reduced to 75° C., and the reaction was allowed to continue overnight. The reaction product was extracted into benzene and recrystallized from toluene and isopropanol to afford the desired product (87% yield, m.p. 144–145° C.

Example 2

Polymerization of 1,3,5-Tri(Phenylethynyl)Benzene and Conversion into Carbon.

The monomer (10.4 mg) was weighed into a TGA boat, cured, and carbonized by heating from 30 to 850° C. in nitrogen at 10° C./min. resulting in a char yield of 73%. The monomer lost 13 wt % between 275 and 375° C. Between 375 and 500° C., little weight loss occurred. From 500 to 600° C., another 10% weight loss occurred. Only a small weight loss occurred between 600 and 850° C. resulting in carbonization.

Example 3

Polymerization of 1,3,5-Tri(Phenylethynyl)Benzene and Conversion into Carbon.

The monomer (11.4 mg) was weighed into a TGA boat and cured by heating from 30 to 400° C. at in a 100 cc/min flow of $N_2$ and holding under $N_2$ at 400° C. for 1 hour and at 450° C. for 1 hour. The sample was then cooled to room temperature. A TGA thermogram in nitrogen showed a char yield of 83%.

Example 4

Oxidative Stability of Polymer/Carbon formed from 1,3,5-Tri(Phenyl-ethynyl)Benzene.

The monomer (7.8 mg) was weighed into a TGA boat and cured in situ by heating in air from 30 to 700° C. at 10° C./min. The formed polymer starts to break down above 500° C. with catastrophic decomposition occurring between 600 and 650° C.

Example 5

Polymerization and Carbonization of 1,3,5-Tri(Phenylethynyl)-Benzene.

The monomer (0.5 g) was weighed into an aluminum planchet and polymerized by heating in air at 200° C. for 1 hour, at 275° C. for 1 hour, and at 300° C. for 3 hours. The black polymer was void-free. The thermosetting polymer was carbonized by heating under an oxygen-free argon atmosphere to 900° C.

Example 6

Synthesis of 1,2,4,5-Tetrakis(Phenylethynyl)Benzene.

Phenylacetylene (4.697 g, 45.98 mmol), 1,2,4,5-tetrabromobenzene (4.113 g, 10.45 mmol), triethylamine (29.1 ml, 209 mmol), pyridine (16.9 ml, 209 mmol) and a magnetic stirring bar were combined in a 250 ml round bottom flask. The flask was fitted with a septum and then chilled in an isopropanol/dry ice bath. Meanwhile, the catalyst, which consisted of $Pd(PPh_3)Cl_2$ (0.147 g, 0.209 mmol), CuI (0.139 g, 0.731 mmol) and $PPh_3$ (0.294 g, 1.120 mmol) was weighed out. After the flask had cooled, it was degassed by the alternate application of partial vacuum and argon several times. The catalyst was quickly added to the flask, the septum was refitted and the flask was again degassed. The flask was warmed up to room temperature and then set in an oil bath (80° C.) for reaction overnight. The product mixture was poured into 200 ml of water resulting in the separation of a solid. The reaction product was extracted with methylene chloride. The product was not entirely soluble with some crystals forming at the interface between the methylene chloride and water. Recrystallization from methylene chloride and ethanol afforded 1,2,4,5-tetrakis(phenylethynyl)benzene in 84% yield; mp: found 194–196° C., lit.193–194° C.

Example 7

Polymerization of 1,2,4,5-Tetrakis(Phenylethynyl)Benzene.

The monomer (0.26 g) was weighed into an aluminum planchet and cured by heating in air at 200° C. for 1 hour, at 225° C. for 2 hours, and at 275° C. for 1 hour resulting in solidification. Almost immediately after melting, the monomer started to darken. Within 45 minutes, the melt had become fairly viscous. After heating at 275° C., the polymer had not lost any weight. The polymer was removed from the planchet and used for characterization studies. An infrared spectrum showed the absence of an absorption centered at 2212 $cm^{-1}$ attributed to an acetylenic carbon—carbon triple bond.

Example 8

Polymerization and Carbonization of 1,2,4,5-Tetrakis(Phenylethynyl)Benzene.

The monomer (15.1 mg) of Example 5 was weighed into a TGA boat and cured by heating under a nitrogen atmosphere at 225° C. for 2 hours, at 300° C. for 2 hours, and at 400° C. for 2 hours resulting in the formation of a solid thermosetting polymeric material. During the heat treatment, the sample lost 1.1% weight. Upon cooling, a TGA thermogram was taken between 30 and 900° C. resulting in a char yield of 85%.

Example 9

Carbonization of 1,2,4,5-Tetrakis(Phenylethynyl)Benzene.

A TGA thermogram was taken of the polymer formed from Example 6 between 30 and 900° C. under inert conditions. At 900° C., the carbon residue exhibited a char yield of 85%.

Example 10
Oxidation of Carbon formed from 1,2,4,5-Tetrakis (Phenylethynyl) Benzene.

A TGA thermogram was taken of the carbon residue obtained in Example 7 between 30 and 800° C. in a flow of air at 50 cc/min. The carbon showed outstanding oxidative stability. The sample started to slowly lose weight at approximately 500° C. with catastrophic decomposition occurring between 600 and 800° C.

Example 11
Synthesis of 1,2,4-Tris(Phenylethynyl)Benzene.

Phenylacetylene (4.858 g, 47.56 mmol), 1,2,4-tribromobenzene (4.159 g, 13.21 mmol), CuI (0.0278 g, 0.146 mmol) and a stirring bar were added to a 100 ml round bottom flask (flask #1), and the flask was fitted with a septum. A catalyst, which was prepare by the following method, was added: Into another 100 ml round bottom flask (flask #2) was added Pd(PPh$_3$)$_2$Cl$_2$ (0.0278 g, 0.0396 mmol), and PPh$_3$ (0.0556 g, 0.2122 mmol), Mg (0.0963 g, 3.963 mmol), diisopropylamine (40.10 g, 396.3 mmol, 55.6 ml) and a stirring bar. The flask was fitted with a septum, chilled in a dry ice/isopropanol bath and degassed by the alternate application of vacuum and argon gas several times. The flask was set in a hot water bath (80° C.) and stirred for 5 minutes. The flask was cooled, and the solution was decanted into flask #1. Pyridine (15.67 g, 198.2 mmol, 16.0 ml) was then added to flask #2, and the septum was refitted. The flask was chilled and degassed. This flask was then set with stirring into a hot water bath (80° C.) for 5 minutes. After cooling this solution was also decanted into flask #1. The reaction mixture in flask #1 was again fitted with a septum, chilled in a dry ice/isopropanol bath and degassed by the alternate application of vacuum and argon. This flask was warmed up and then placed in an oil bath (77° C.) for reaction overnight. The next day the flask was full of a white precipitate, the ammonium salt by-product. The reaction mixture was then poured into a beaker containing water, and the organic solvents were allowed to evaporate in a hood. The 1,2,4-tris(phenylethynyl)-benzene solid which formed in the water as the low boiling organics evaporated was obtained by Buchner filtration. The solid was recrystallized from methylene chloride and isopropanol to afford 3.19 gram (64%) of the desired product, m.p. found 105–109° C., lit. not present.

Example 12
Polymerization of 1,2,4-Tris(Phenylethynyl)Benzene.

The monomer (1.0 g) was weighed into an aluminum planchet and cured by heating either in air or under an inert atmosphere at 200° C. for 1 hour, at 275° C. for 1 hour, and at 350° C. for 2 hours. The resulting thermosetting polymer was removed from the planchet. During the heat treatment, the sample lost about 8 percent of its weight. Infrared studies showed the disappearance of characteristics absorptions attributed to the acetylenic units.

Example 13
Direct Carbonization of 1,2,4-Tris(Phenylethynyl)Benzene in Nitrogen.

The monomer (12.3 mg) was weighed into a TGA boat, cured and carbonized by heating from 30° C. to 950° C. at 10° C./min in a nitrogen flow of 50 cc/min. During the heat treatment, the monomer/polymer commenced to slowly lose weight at approximately 250° C. The sample lost about 6% weight between 250–300° C. followed by a cessation of further weight loss until approximately 450° C. Between 450 and 600° C., the sample lost another 10% weight attributed to breakage of bonds, reorganization, and ultimate carbonization. At 900° C., the carbonized sample had a char yield of 82%.

Example 14
Polymerization in Air and Thermal Stability of 1,2,4-Tris (Phenylethynyl)Benzene.

The monomer (15.2 mg) was weighed into a TGA boat and cured by heating at 200° C. for 4 hours and at 250° C. in a flow of air. During the heat treatment, the sample lost about 6% weight. Upon cooling and running a TGA thermogram under a flow of nitrogen from 30 to 950° C., the polymer was carbonized yielding a char yield of 83%. The weight loss observed in Example 12 between 250–300° C. was missing.

Example 15
Polymerization in Nitrogen and Thermal Stability of 1,2,4-Tris-(Phenylethynyl)Benzene.

The monomer (13.3 mg) was weighed into a TGA boat and cured by heating at 200° C. for 4 hours and at 250° C. for 4 hours. During the heat treatment, the sample lost approximately 6% weight. The polymer was then cooled. A thermogram was then determined on the polymer between 30° C. and 950° C. in a flow of nitrogen at 50 cc/min. The carbonized sample had a char yield of 82%.

Example 16
Oxidation Stability of Black Carbonaceous Mass Formed from Carbonization of 1,2,4-Tri(Phenylethynyl)Benzene.

The carbonized residue (10.2 mg) from Example 14 was cooled and a TGA thermogram obtained from 30° C. to 800° C. in a flow of air at 50 cc/min. The sample behaved as most carbon samples. The sample showed outstanding stability to approximately 500° C. with catastrophic degradation occurring between 550° C. and 700° C.

Prophetic Example 17
High Temperature Pyrolysis of Carbon formed from 1,2,4,5-Tetrakis-(Phenylethynyl)Benzene to Form Graphitic Inclusions.

Heat the carbon residue obtained in Example 7 in a graphitic furnace under He to 3000° C.

Obviously, many modifications and variations of the present invention are possible in light of the above teachings. It is therefore to be understood that, within the scope of the appended claims, the invention may be practiced otherwise than as specifically described.

What is claimed is:

1. A process for making amorphous carbon with high char yield and low porosity, comprising the step of pyrolyzing a compound with the formula:

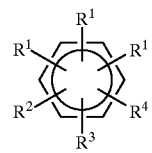

wherein R$^1$ is —C≡Cϕ, and wherein R$^2$, R$^3$, and R$^4$ are independently selected from the group consisting of alkyl, alkenyl, alkynyl, aryl (all of which may be substituted or unsubstituted), and combinations thereof, —H, and —C≡Cϕ, or a mixture of two or more of said compounds, or a polymer of one or more of said compounds, by heating said compound or mixture or polymer to a temperature between the temperature at which significant pyrolysis begins and the temperature at which significant graphitization begins, to form an amorphous cross-linked structure.

2. The process of claim 1, wherein pyrolyzing said compound or mixture or polymer comprises heating said compound or mixture or polymer in an essentially nonoxidizing atmosphere.

3. The process of claim 1, wherein pyrolyzing said compound or mixture or polymer comprises heating said compound or mixture or polymer in an essentially inert atmosphere.

4. The process of claim 1, wherein pyrolyzing said compound or mixture or polymer comprises heating said compound or mixture or polymer to a temperature between about 450° C. and about 1000° C.

5. The process of claim 1, wherein pyrolyzing said compound or mixture or polymer comprises heating said compound or mixture or polymer to a temperature between about 700° C. and about 950° C.

6. The process of claim 1, wherein pyrolyzing said compound or mixture or polymer comprises heating said compound or mixture or polymer at approximately atmospheric pressure.

7. The process of claim 1, wherein pyrolyzing said compound or mixture or polymer comprises heating said compound or mixture or polymer at a pressure above atmospheric pressure.

8. The process of claim 1, and further comprising the step of pyrolyzing said amorphous cross-linked structure under a nonoxidizing or inert gas to a temperature between the temperature at which significant graphitization begins and about 3000° C.

9. The process of claim 8, wherein said step of pyrolyzing said amorphous cross-linked structure under a nonoxidizing or inert gas to a temperature between the temperature at which significant graphitization begins and about 3000° C. comprises pyrolyzing said amorphous cross-linked structure under a nonoxidizing or inert gas to a temperature between about 1000° C. and about 3000° C.

10. The process of claim 1, wherein at least one of said $R^2$, $R^3$, and $R^4$ are —C≡Cφ.

11. The process of claim 1, wherein one of said $R^2$, $R^3$, and $R^4$ are —C≡Cφ, and the remaining two of said $R^2$, $R^3$, and $R^4$ are —H.

12. The process of claim 1, wherein each of said compounds is selected from the group consisting of

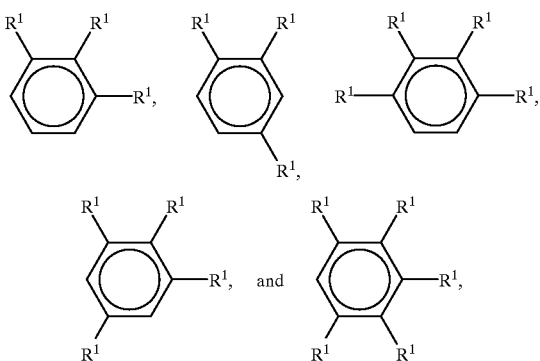

* * * * *